US008813770B2

(12) United States Patent
Parsinejad et al.

(10) Patent No.: US 8,813,770 B2
(45) Date of Patent: Aug. 26, 2014

(54) PIG ASSEMBLY AND METHOD FOR MAINTAINING A FUNCTIONAL LINE FOR CONVEYING FLUID

(71) Applicants: Farzan Parsinejad, Houston, TX (US); Antonio Carlos Falcao Critsinelis, Kingwood, TX (US); Sid A. Mebarkia, Sugarland, TX (US); Christopher Allen Kassner, Houston, TX (US)

(72) Inventors: Farzan Parsinejad, Houston, TX (US); Antonio Carlos Falcao Critsinelis, Kingwood, TX (US); Sid A. Mebarkia, Sugarland, TX (US); Christopher Allen Kassner, Houston, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 46 days.

(21) Appl. No.: 13/738,740

(22) Filed: Jan. 10, 2013

(65) Prior Publication Data
US 2014/0190574 A1    Jul. 10, 2014

(51) Int. Cl.
*B08B 9/055* (2006.01)
*F16L 55/46* (2006.01)
*F16L 55/38* (2006.01)

(52) U.S. Cl.
CPC .................................. *F16L 55/38* (2013.01)
USPC ... 137/15.07; 137/268; 137/242; 15/104.062; 15/104.05

(58) Field of Classification Search
USPC .................. 137/15.07, 268, 242; 15/104.061, 15/104.062, 104.03, 104.05
See application file for complete search history.

(56) References Cited

U.S. PATENT DOCUMENTS

| 4,844,165 | A | 7/1989 | Van Der Steeg et al. |
| 5,113,544 | A * | 5/1992 | Webb ....................... 15/104.061 |
| 5,992,247 | A | 11/1999 | Manestar |
| 6,695,537 | B2 | 2/2004 | Spraggon |
| 7,328,475 | B2 | 2/2008 | Smith et al. |
| 7,827,646 | B2 * | 11/2010 | Pruett ........................ 15/104.05 |
| 7,959,740 | B2 * | 6/2011 | Chevallier ................ 15/104.061 |
| 2005/0284504 | A1 | 12/2005 | Kinnari et al. |

FOREIGN PATENT DOCUMENTS

JP       2004290806     10/2004

OTHER PUBLICATIONS

PCT/US2013/071853, International Preliminary Report, mailing date Feb. 12, 2014, pp. 1-6.

* cited by examiner

*Primary Examiner* — Kevin Lee
(74) *Attorney, Agent, or Firm* — Karen R. DiDomenicis

(57) ABSTRACT

Disclosed is a pig assembly for maintaining a functional line for conveying fluid. In one aspect, the pig assembly includes a larger diameter pig having an internal compartment and at least one smaller diameter pig adapted to fit therein. The larger diameter pig is capable of passing through a larger diameter functional line and the smaller diameter pig is capable of passing through a smaller diameter functional line. In another aspect, a method for maintaining a functional line for conveying fluid is provided which includes pigging a subsea line having at least a larger diameter functional line and a smaller diameter functional line in fluid communication with one another using a pig assembly as described herein.

18 Claims, 8 Drawing Sheets

PIG ASSEMBLY AND METHOD FOR MAINTAINING A FUNCTIONAL LINE FOR CONVEYING FLUID

FIELD

The present disclosure relates to pig assemblies and methods for maintaining subsea functional lines and/or risers.

BACKGROUND

As subsea hydrocarbon production systems have evolved over time, certain challenges have become more problematic. One challenge is that subsea pipeline systems now cover greater areas, therefore the pipelines must traverse greater distances. Pipeline system designers would like to have greater flexibility to utilize various sizes and types of subsea pipeline, particularly as systems become larger and more complex. Another challenge is that as pipeline is laid in deeper and deeper water, the weight of the pipeline can create too much tension to safely install. Another challenge is that certain subsea production fields necessitate subsea pipeline crossing difficult geographical formations, including canyons, scarps and rough terrain. In these situations, it would frequently be desirable to utilize a flexible and/or lighter weight pipe or conduit for at least a portion of the pipeline system.

A consideration which often limits the pipeline system designer's ability to design pipeline systems adapted to such challenges is the piggability of the lines in the systems. It would be desirable to have the ability to provide subsea pipeline systems including transitions between various types of pipe as well as various pipe diameters; however such systems are not piggable with current technology. It would be desirable to provide such systems while retaining the ability to effectively pig the lines of the systems.

SUMMARY

In one aspect, a pig assembly for maintaining a functional line for conveying fluid is provided which includes a larger diameter pig having an internal compartment and at least one smaller diameter pig adapted to fit within the internal compartment of the larger diameter pig. The larger diameter pig is capable of passing through a larger diameter functional line and the smaller diameter pig is capable of passing through a smaller diameter functional line; wherein the diameters of the larger diameter functional line and the smaller diameter functional line differ by more than 1 standard API 5L pipeline diameters.

In another aspect, a pig assembly for maintaining a functional line for conveying fluid is provided which includes a pig including an internal compartment and at least one module adapted to fit within the internal compartment and adapted to be released from the pig into the functional line.

In another aspect, a method for maintaining a functional line for conveying fluid is provided which includes pigging a subsea line having at least a larger diameter functional line and a smaller diameter functional line in fluid communication with one another using a pig assembly as described herein. The larger diameter pig passes through the larger diameter functional line and the smaller diameter pig passes through the smaller diameter functional line. The diameters of the larger diameter functional line and the smaller diameter functional line differ by more than 1 standard API 5L pipeline diameters.

DESCRIPTION OF THE DRAWINGS

These and other objects, features and advantages of the present invention will become better understood with reference to the following description, appended claims and accompanying drawings where:

DETAILED DESCRIPTION

Figure 1A:
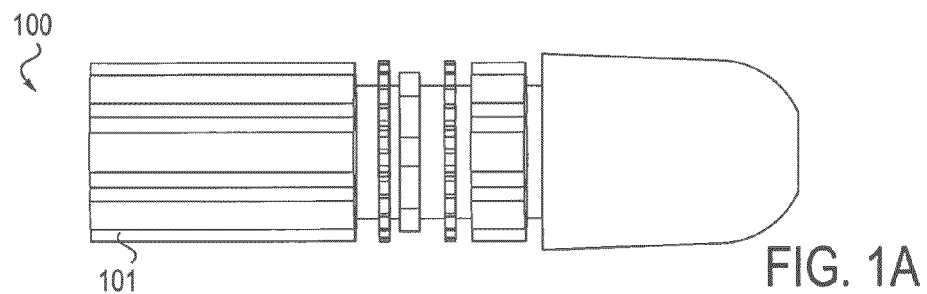
FIG. 1A is a side view of a pig assembly according to one exemplary embodiment.

In one embodiment, a pig assembly for maintaining a functional line for conveying fluid includes a larger diameter pig having an internal compartment and at least one smaller diameter pig adapted to fit within and be released from the internal compartment. The larger diameter pig is capable of passing through a larger diameter functional line and the smaller diameter pig is capable of passing through a smaller diameter functional line, where the larger diameter functional line and the smaller diameter functional line are in fluid communication with each other within a pipeline system. The diameters of the larger diameter functional line and the smaller diameter functional line differ by more than 1 standard API 5L pipeline diameters, even by more than 2 standard API 5L pipeline diameters.

The functional lines of the pipeline system can be subsea pipeline conveying oil and gas production fluids. Alternatively, the functional lines can be selected from oil recovery gas lines, gas lift lines, water lines, well service lines, well kill lines, scale squeeze lines, methanol lines, MEG lines and lines for tertiary recovery fluid, as would be familiar to those skilled in the art. The larger diameter functional line and the smaller diameter functional line can be separate sections of a functional line for conveying fluids where the larger diameter functional line and the smaller diameter functional line are in fluid communication with each other.

The larger diameter and smaller diameter functional lines can be different types of pipe, wherein the types of pipe are selected from rigid pipe and engineered pipe. The engineered pipe can be bonded flexible pipe, unbonded flexible pipe or multilayered composite pipe.

In one embodiment, the larger diameter functional line can have a diameter of at least 5.1 cm. In one embodiment, the larger diameter functional line can have a diameter of from 5.1 cm to 102 cm. The smaller diameter functional line can have a smaller diameter than the larger functional line. In some embodiments, the diameters of the larger diameter functional line and the smaller diameter functional line differ by more than 1 standard API 5L pipeline diameters. One of the functional line diameters can be at least 10.2 cm, even from 10.2 cm to 102 cm. Another of the functional line diameters can be at least 5.1 cm, even from 5.1 cm to 91.4 cm. Various combinations of pipeline diameters can be used. Thus, systems including a combination such as, for example, a functional line having a nominal pipe size (NPS) of 40 in (outer diameter of 101.6 cm) in fluid communication with a functional line having a NPS of 21 in (outer diameter of 53.0 cm) can be provided by the present disclosure. The present disclosure also provides other combinations, including, as nonlimiting examples, a functional line having a NPS of 40 in (outer diameter of 101.6 cm) in fluid communication with a functional line having a NPS of 16 in (outer diameter of 40.6 cm); a functional line having a NPS of 3½ in (outer diameter of 8.89 cm) in fluid communication with a functional line having a NPS of 6⅝ in (outer diameter of 16.8 cm); and a functional line having a NPS of 14 in (outer diameter of 35.6 cm) in fluid communication with a functional line having a NPS of 20 in (outer diameter of 50.8 cm). Regardless of the diameter difference between the larger diameter functional line and the smaller diameter functional line, the pig assembly of the present disclosure can be used to pig the system.

Figure 1B:
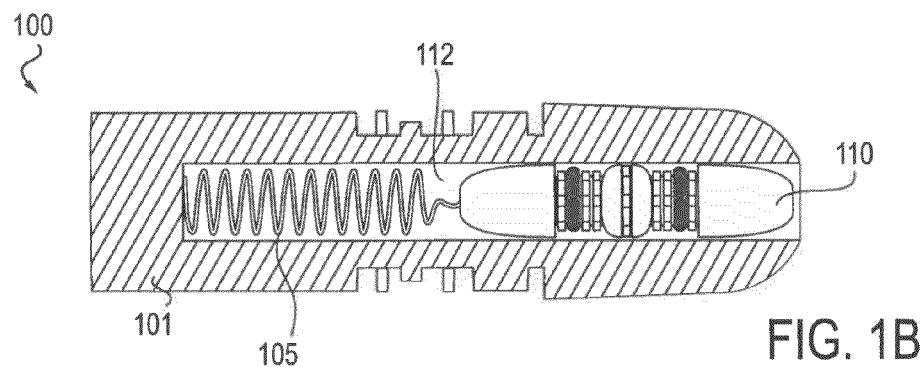
FIG. 1B is a cutaway side view of the pig assembly illustrated in FIG. 1A.

In one embodiment, as in FIG. 1A (side view) and FIG. 1B (cutaway side view), a pig assembly 100 includes a larger diameter pig body 101, also referred to as a larger diameter pig 101, having an internal compartment 112 sized to contain a smaller diameter pig 110. The smaller diameter pig 110 can be connected by a tether 105 to the larger diameter pig 101. In one embodiment, the tether 105 can be an umbilical capable of transmitting data and/or power from the larger diameter pig to the smaller diameter pig. Alternatively, the tether 105 can be tubing used to provide hydraulic fluid to the smaller diameter pig 110. Alternatively, the tether 105 can be any type of tether used to retrieve the smaller diameter pig 110 to the pig assembly 100. In another embodiment, no tether is used. In another embodiment, no tether is used and the smaller diameter pig 110 can be powered by a battery (not shown).

Figure 2A:
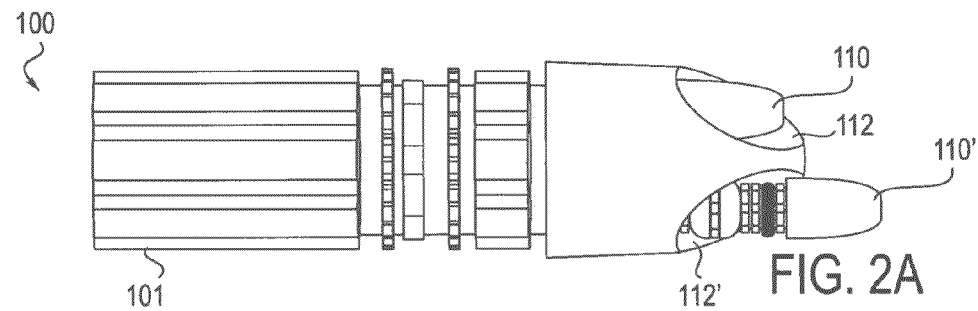
FIG. 2A is a side view of a pig assembly according to one exemplary embodiment.
Figure 2B:
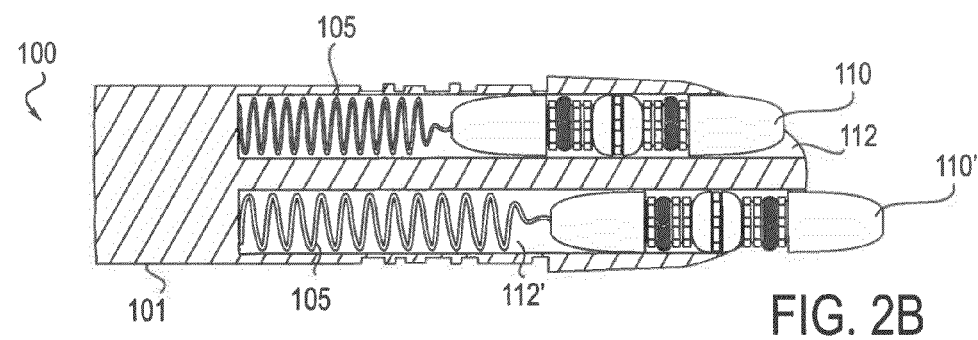
FIG. 2B is a cutaway side view of the pig assembly illustrated in FIG. 2A.

As illustrated in FIGS. 2A and 2B, multiple smaller diameter pigs 110 and 110' can be provided in multiple internal compartments 112 and 112' sized to contain the smaller diameter pigs 110 and 110', respectively, within the pig assembly 100. In FIG. 2B, smaller diameter pigs 110 and 110' are attached to the larger diameter pig 101 by means of optional tethers 105.

Pigging of a subsea line can be initiated by launching the larger diameter pig of the pig assembly from a pig launcher into a larger diameter functional line so that the larger diameter pig travels in the direction of a smaller diameter functional line and, upon arriving at the smaller diameter functional line, the at least one smaller diameter pig is released from the larger diameter pig into the smaller diameter functional line.

The smaller diameter pig can be propelled in the smaller diameter functional line by the flow in the line, or self propelled by a motor within the smaller pig. The motor can be powered by hydraulic or electrical power supplied through a tether from the larger diameter pig, or by a battery, hydrogen cell, pressure accumulator or radioactive source.

In some embodiments, the pig assembly 100 includes a release mechanism for releasing the at least one smaller diameter pig 110 from the larger diameter pig 101 into the smaller diameter functional line when the larger diameter pig is proximate a juncture between the larger diameter functional line and the smaller diameter functional line. Alternatively, the smaller diameter pig can be released from the larger diameter pig when the larger diameter pig is proximate an at least partial blockage within the smaller diameter functional line. The release mechanism for releasing the at least one smaller diameter pig from the larger diameter pig can be activated in response to a physical impact of a mechanical release mechanism, an impact with a spring-loaded mechanism, an acoustic signal, a magnetic field, a wireless signal or a timing device. An example of a timing device is a programmed timer embedded in the pig assembly which can activate the release mechanism at the desired time with respect to a reference event. A reference event can be, e.g., the start of pig travel, or pig arrival at a destination structure such as a PLET, pipeline manifold and the like.

Figure 3A:
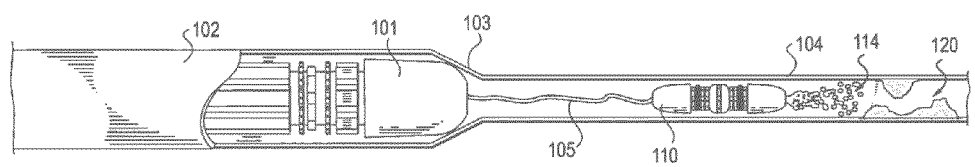
FIGS. 3A-C are side views illustrating a pig assembly according to three alternative exemplary embodiments utilized to remove a pipeline blockage.
Figure 3B:
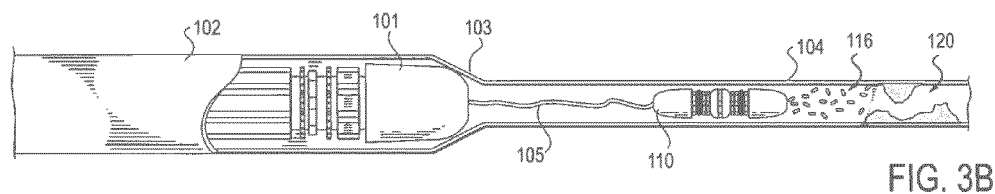
Figure 3C:
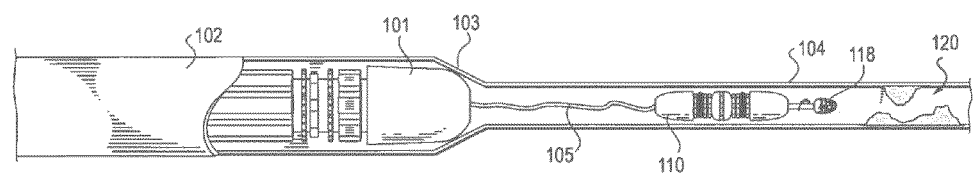
Figure 4A:
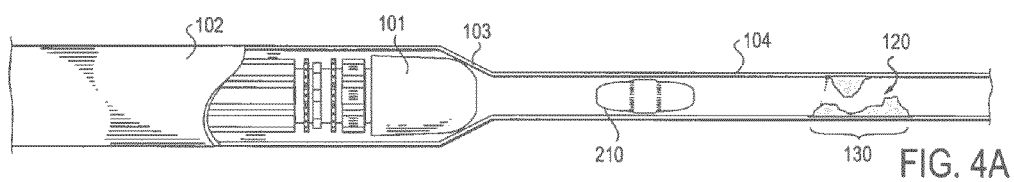
FIGS. 4A-D are side views illustrating a pig assembly according to one exemplary embodiment utilized to remove a pipeline blockage.
Figure 4B:
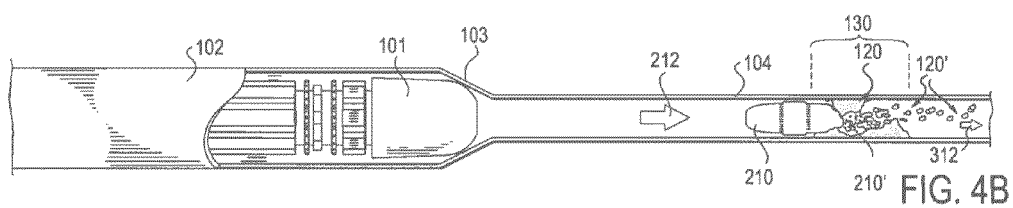
Figure 4C:
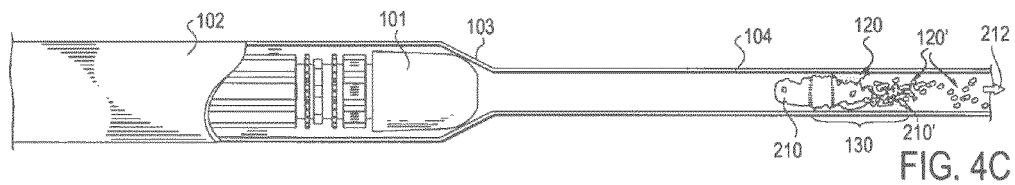
Figure 4D:
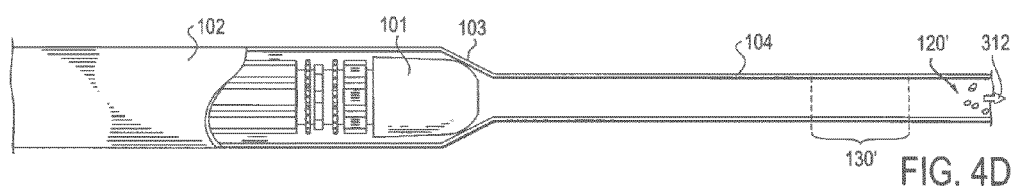

In one embodiment, the smaller diameter pig 110 can be a chemical treatment module for delivering a substance for chemically treating a section of the functional line. FIG. 3A illustrates a pig assembly 100 which, upon arriving at the juncture between a larger diameter functional line 102 and a smaller diameter functional line 104, has released the smaller diameter pig 110 into the smaller diameter functional line 104. The smaller diameter pig 110 has released a chemical substance 114 capable of dissolving the blockage 120 partially blocking the smaller diameter functional line 104. The blockage 120 can be, e.g., a hydrate deposit, solid wax deposit, etc. Nonlimiting examples of such chemical substances include ethanol, methanol, MEG, surfactants, solvents, liquid salts, exothermic components, and the like. FIG. 3B illustrates a similar embodiment, in which the smaller diameter pig 110 has released capsules 116 containing a chemical substance capable of dissolving the partial blockage 120. The capsules 116 dissolve to release the chemical substance. In some embodiments, multiple chemicals are released by the capsules 116 which react in an exothermic reaction to generate heat which can melt or dissolve the partial blockage 120. Nonlimiting examples of such chemical substances include ethanol, methanol, MEG, surfactants, solvents, liquid salts, exothermic components, and the like. In another embodiment, illustrated in FIG. 3C, the smaller diameter pig 110 can be a repair module having rotary blades 118 capable of spinning and thereby mechanically removing the partial blockage 120.

For simplicity, the figures herein illustrate larger diameter functional lines, e.g., larger diameter functional line 102, transitioning directly into smaller diameter functional lines, e.g., smaller diameter functional line 104. However, it is to be understood that a pipeline connection termination (not shown) can be connected between the larger diameter functional lines 102 and the smaller diameter functional lines 104. By "pipeline crossing termination" is meant a subsea structure such as a manifold capable of connecting to at least a first and a second functional line such that the first functional line and the second functional line are placed in fluid communication with one another. The subsea structure may be capable of isolating at least two functional lines connected to the subsea structure from one another. In some embodiments, a pipeline crossing termination can be located between the at least one riser and the at least one functional line on the seabed. In some embodiments, a pipeline crossing termination can be located between the first and second functional lines on the seabed. In some embodiments, the pipeline crossing termination can include a subsea pig launcher capable of housing at least one pig assembly according to the present disclosure and introducing a pig into a functional line. The pig can be either the larger diameter pig or the smaller diameter pig of the pig assembly as described herein. As previously described, the system can include at least one functional line and at least one riser, or at least a first and second functional line wherein one functional line has a larger diameter than the other. The larger diameter or smaller diameter pig can travel in any direction and stop at any point through the system. Through pigging the system, the functional line(s) and/or the riser(s) of the system can be maintained.

In one embodiment, as shown in FIGS. 4A-D, the smaller diameter pig 210 can be itself formed of a chemical substance which is, upon being released from the larger diameter pig 101, capable of dissolving itself and dissolving the blockage 120 partially blocking the smaller diameter functional line 104. For example the smaller diameter pig 210 can be a gel pig, or a pig having an external membrane with a chemical inside.

Figure 5A:
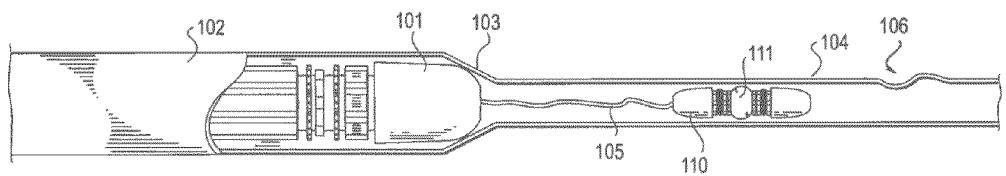
FIGS. 5A-B are side views illustrating a pig assembly according to one exemplary embodiment as utilized to repair a damaged section of pipeline.
Figure 5B:
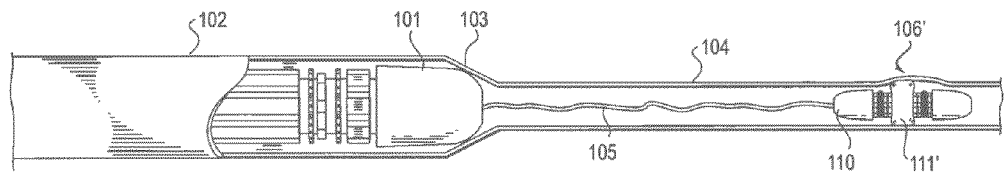

In one embodiment, the smaller diameter pig 110 can be an expansion module for isolating a section of the functional line. FIG. 5A illustrates a pig assembly 100 which, upon arriving at the juncture between the larger diameter functional line 102 and smaller diameter functional line 104, has released the smaller diameter pig 110 into the smaller diameter functional line 104. The smaller diameter pig 110 has an expandable sleeve 111. The sleeve is made to expand by applying hydraulic pressure from the larger pig via the umbilical. When expanded, the sleeve is capable of sealing the pipeline 104. Furthermore, as illustrated in FIG. 5B, when expanded, the sleeve 111' can be used to repair a dent 106, expanding the dented portion of the pipeline as shown at 106'. The larger diameter pig 101 can also have a seal capable of isolating and/or repairing a section of the larger diameter functional line. The smaller diameter pig 110 travels and stops at a pre-determined location near the damaged section in the smaller diameter functional line 104. The smaller diameter pig 110 then expands against the inner walls of the smaller diameter functional line 104 and by doing so, it isolates the damaged section and provides a sealing barrier for repair.

Figure 6A:
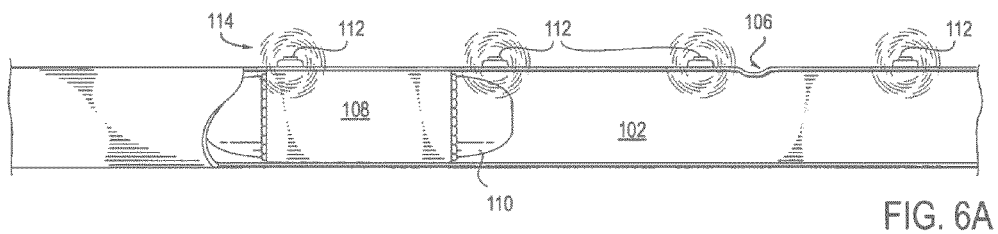
FIGS. 6A-C are side views illustrating a pig assembly according to one exemplary embodiment as utilized to repair a damaged section of pipeline.
Figure 6B:
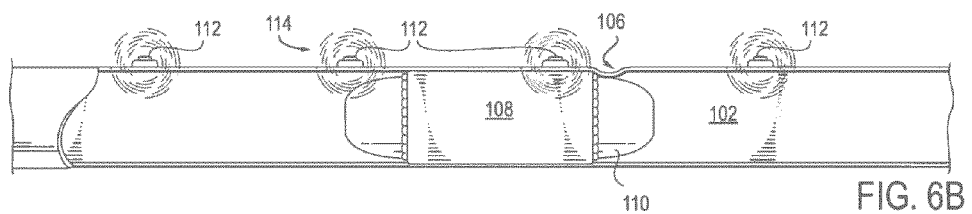
Figure 6C:
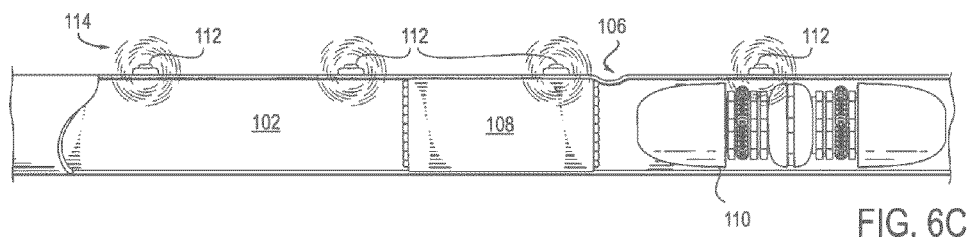

In one embodiment, a pipeline system is disclosed in which wireless signals are employed to direct the motion of the larger diameter pig and/or the smaller diameter pig 110. FIGS. 6A-6C illustrate such a system in which transmitters 112 transmit wireless signals 114 which are received by sensors (not shown) in the larger and/or smaller diameter pig of the pig assembly 100. In the embodiment shown, the larger diameter pig is itself a sleeve 108 surrounding the smaller diameter pig 110. The sleeve 108 is stopped adjacent a dent 106 in the pipeline 102, whereupon the smaller diameter pig 110 is released and continues to move through the line past the dent 106. The sleeve 108 expands against the inner walls of the line 102 and by doing so, it seals that particular section of pipe. Here the drawing shows that the motion of the sleeve 108 and smaller diameter pig 110 are controlled by wireless signals, however this functionality could also be achieved by a tether system as in previous drawings.

The smaller and/or larger diameter pig can include an in line inspection tool. For instance, this can be a tool equipped with multiple sensors designed to measure specific parameters such as wall thickness, crack dimensions, using specific techniques such as ultrasound, x-ray, etc. Other in line inspection tools can be used as would be apparent to one skilled in the art.

In one embodiment, the smaller diameter functional line can be a riser attached to an offshore production platform for conveying fluid to the production platform. The riser can be in fluid communication with at least one functional line located on the seabed. The functional line diameter and the riser diameter differ by more than 1 standard API 5L pipeline diameters, even by more than 2 standard API 5L pipeline diameters. The functional line diameter can be at least 10.2 cm, even from 10.2 cm to 102 cm. The riser diameter can be at least 5.1 cm, even from 5.1 cm to 91.4 cm. Thus, systems including a combination such as, for example, a riser having a nominal pipe size (NPS) of 20 in (outer diameter of 50.8 cm) in fluid communication with a functional line having a NPS of 40 in (outer diameter of 101.6 cm) can be provided by the present disclosure. The present disclosure also provides other combinations, including, as nonlimiting examples, a riser having a NPS of 16 in (outer diameter of 40.6 cm) in fluid communication with a functional line having a NPS of 3½ in (outer diameter of 8.89 cm); and a riser having a NPS of 6⅝ in (outer diameter of 16.8 cm) in fluid communication with a functional line having a NPS of 14 in (outer diameter of 35.6 cm).

In some embodiments, the riser can have a length of at least 10 m, even of 10 m to 5000 m. The riser and the functional line can be different types of pipe, wherein the types of pipe are selected from rigid pipe and engineered pipe. The engineered pipe can be bonded flexible pipe, unbonded flexible pipe or multilayered composite pipe.

In some embodiments, the system can also include a third functional line such that the second functional line is located between the first and third functional lines. For example, the second functional line can cross a section of rough terrain, a subsea scarp or cliff, or a subsea canyon. Each of the first, second and third functional lines can have different diameters, or two of the three functional lines have diameters that differ by more than 1 standard API 5L pipeline diameters.

Figure 7:
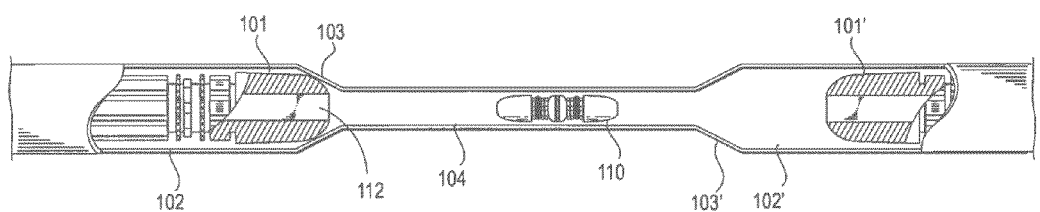
FIG. 7 is a side view of a pig assembly according to one exemplary embodiment as utilized to pig a section of pipeline.

FIG. 7 illustrates a pipeline system in which two larger diameter functional lines 102 and 102' have a smaller diameter functional line 104 extending there between. In the embodiment illustrated, larger diameter pigs 100 and 100' can travel in the larger diameter functional lines 102 and 102', and the smaller diameter pig 110 can travel in the smaller diameter functional line 104. The smaller diameter pig 110 can be released from or received into either of the larger diameter pigs 100 or 100'.

In some embodiments, the system can include two pipeline sections running in parallel with one another. By "running in parallel with one another" is meant that fluid flow through the lines is in parallel, not that the lines are necessarily parallel. This is particularly advantageous when the tension involved in installing a single large diameter line would be too great, thus prohibiting installation of a single pipeline. The tension can be further reduced by the use of lighter weight flexible conduit(s) in place of conventional rigid pipe. For instance, two smaller diameter functional lines can run between two larger diameter functional lines.

Figure 8:
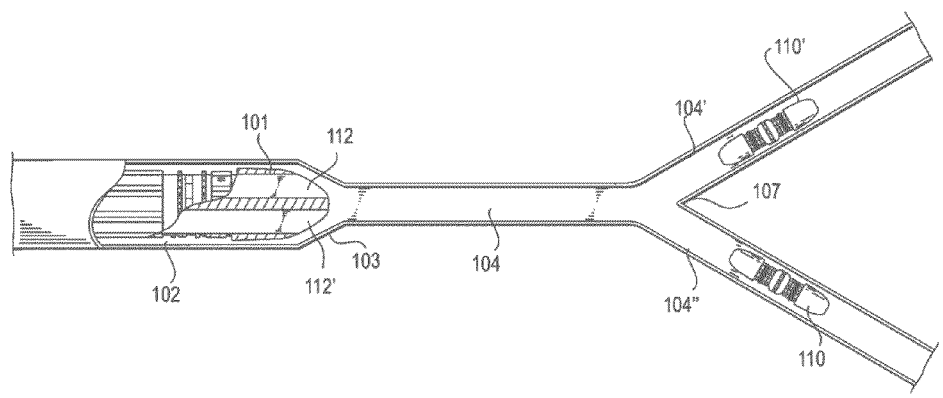
FIG. 8 is a side view of a pig assembly according to one exemplary embodiment as utilized to pig a section of pipeline including a wye.

Alternatively, one larger diameter functional line can branch into two smaller diameter functional lines running in parallel with one another. FIG. 8 illustrates such a pipeline system in which a larger diameter functional line 102 transitions to a smaller diameter functional line 104 which then branches into two smaller diameter functional lines 104' and 104" running in parallel with one another. In the embodiment illustrated, larger diameter pig 100 has two compartments 112 and 112' for smaller diameter pigs 110 and 110' which pass through smaller diameter functional lines 104' and 104".

Figure 9A:
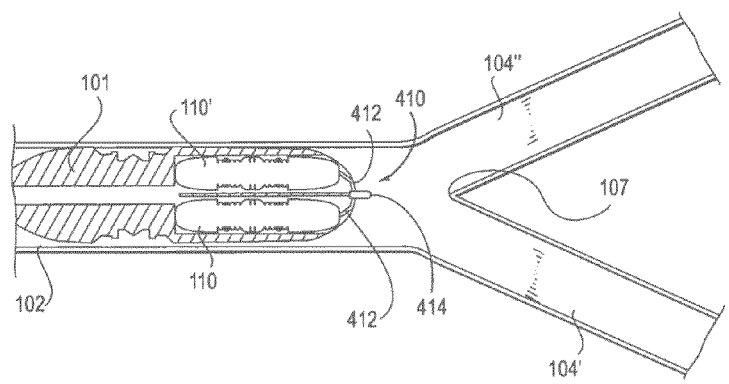
FIGS. 9A-B are side views of a pig assembly according to one exemplary embodiment and having a pig release mechanism as utilized to pig a section of pipeline including a wye.
Figure 9B:
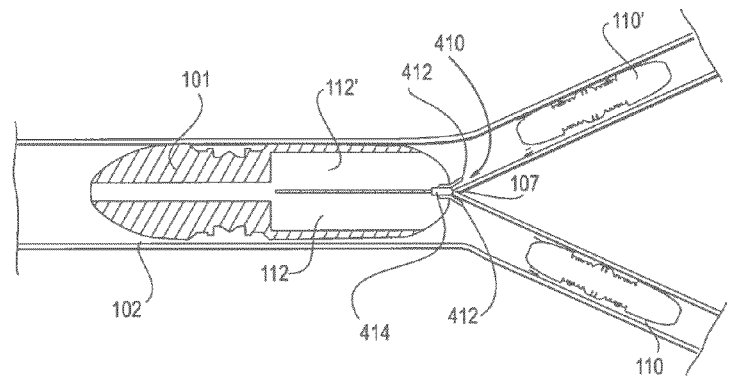

FIGS. 9A and 9B illustrate a pipeline system in which a larger diameter functional line 102 transitions to two smaller diameter functional lines 104' and 104" running in parallel with one another. In the embodiment illustrated, larger diameter pig 100 has two compartments 112 and 112' for smaller diameter pigs 110 and 110' which, upon being released from larger diameter pig 100, pass through smaller diameter functional lines 104' and 104". The release mechanism 410 shown involves the use of two hinged arms 412 attached to a nose or trigger device 414. As shown in FIG. 9A, the two hinged arms 412 are adapted for holding the smaller diameter pigs 110 and 110' in place within the compartments 112 and 112'. When the nose or trigger device 414 contacts the pipe intersection 107, the arms 412 move to the open position as shown in FIG. 9B, and the smaller diameter pigs 110 and 110' are released into smaller diameter functional lines 104' and 104".

Figure 10A:
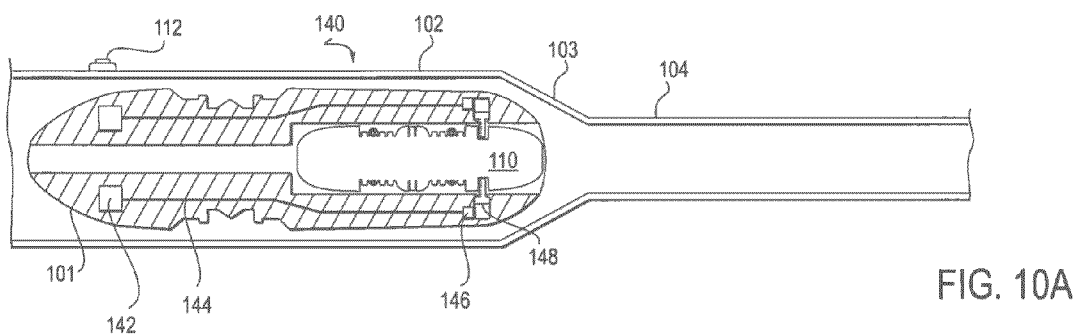
FIGS. 10A-B are side views of a pig assembly according to one exemplary embodiment and having an alternative pig release mechanism as utilized to pig a section of pipeline.
Figure 10B:
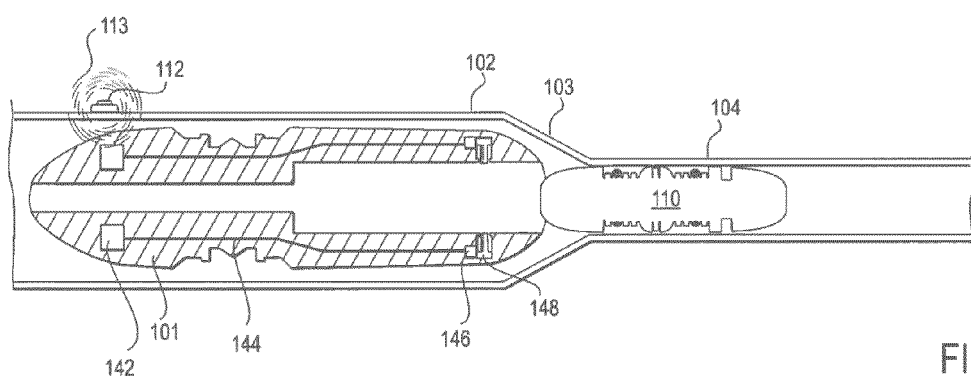

FIGS. 10A and 10B illustrate a pipeline system in which a larger diameter functional line 102 transitions to a smaller diameter functional line 104. In the embodiment illustrated, smaller diameter pig 110 is released from larger diameter pig 100 at the transition 103 in the line. The release mechanism 140 involves the use of two retractable retaining pins 148 in the larger diameter pig 100 capable of protruding into corresponding notches in the smaller diameter pig 110 for locking the smaller diameter pig 110 in the larger diameter pig 100, as shown in FIG. 10A. The retaining pins 148 can be controlled to retract from the smaller diameter pig 110, thereby releasing the smaller diameter pig 110, as shown in FIG. 10B. The retaining pins 148 can be controlled through electrical or hydraulic signals delivered to the pins 148 through control element 142, conductor 144 and connection 146. Control element 142 can be a capacitor, battery, hydraulic accumulator or a solenoid valve. Conductor 144 can be an electrical wire, fiber optics, or a hydraulic line.

In some embodiments, the system can include two risers running in parallel with one another connected to the functional line located on the seabed and also connected to the offshore production platform. Again, the two parallel risers can be lighter weight flexible pipe such that the stress on the connection with the platform is not excessively high.

In some other embodiments, the system includes two functional lines running in parallel with one another located on the seabed connected to a riser which is attached to an offshore production platform. Such a system can be used for various reasons, including providing flexibility to transport production fluids from multiple sources to a single riser.

The first and second and optional third functional lines can be subsea pipeline conveying oil and gas production fluids. Alternatively, the functional lines can be selected from oil recovery gas lines, gas lift lines, water lines, well service lines, well kill lines, scale squeeze lines, methanol lines, MEG lines and lines for tertiary recovery fluid, as would be apparent to one skilled in the art.

The first and second and optional third functional lines can be different types of pipe, wherein the types of pipe are selected from rigid pipe and engineered pipe. The engineered pipe can be bonded flexible pipe, unbonded flexible pipe or multilayered composite pipe.

By providing the ability to pig pipeline systems having differing pipeline diameters, the pig assembly of the present disclosure is particularly useful to facilitate pipeline systems and pipeline installation in certain scenarios. In one such scenario, larger diameter pipelines can be installed on the seabed, and pipeline crossing terminations can be installed on the seabed connected to the larger diameter pipelines on each side of a subsea canyon. Extending between the pipeline crossing terminations, across the subsea canyon, can be two parallel lighter weight, smaller diameter flexible pipelines. In a similar scenario, pipeline crossing terminations can be installed on the seabed on each side of a subsea scarp or cliff with two parallel functional lines extending there between. In another scenario, a pipeline crossing termination can be installed on the seabed at a shallower water depth, and two parallel functional lines running in parallel with one another can extend into progressively deeper water. In yet another scenario, a pipeline crossing termination can be installed on the seabed at the base of a marine riser. In this embodiment, the pipeline crossing termination connects the two parallel functional lines running in parallel with one another on the seabed with the riser, which in turn is connected to an offshore production platform.

Where permitted, all publications, patents and patent applications cited in this application are herein incorporated by reference in their entirety, to the extent such disclosure is not inconsistent with the present invention.

Unless otherwise specified, the recitation of a genus of elements, materials or other components, from which an individual component or mixture of components can be selected, is intended to include all possible sub-generic combinations of the listed components and mixtures thereof. Also, "comprise," "include" and its variants, are intended to be non-limiting, such that recitation of items in a list is not to the exclusion of other like items that may also be useful in the materials, compositions, methods and systems of this invention.

From the above description, those skilled in the art will perceive improvements, changes and modifications, which are intended to be covered by the appended claims.

What is claimed is:

1. A pig assembly for maintaining a functional line for conveying fluid, comprising:
    a. a larger diameter pig having an internal compartment, wherein the larger diameter pig is capable of passing through a larger diameter functional line; and
    b. at least one smaller diameter pig capable of passing through a smaller diameter functional line wherein the at least one smaller diameter pig is adapted to fit within the internal compartment of the larger diameter pig;
        wherein the diameters of the larger diameter functional line and the smaller diameter functional line differ by more than 1 standard API 5L pipeline diameters, further comprising a release mechanism for releasing the at least one smaller diameter pig from the larger diameter pig into the smaller diameter functional line.

2. The pig assembly of claim 1, wherein the release mechanism for releasing the at least one smaller diameter pig from the larger diameter pig is activated in response to a physical impact of a mechanical release mechanism, an impact with a spring-loaded mechanism, an acoustic signal, a magnetic field, a wireless signal or a timing device.

3. The pig assembly of claim 1, wherein the release mechanism is adapted to release the at least one smaller diameter pig from the larger diameter pig into the smaller diameter functional line when the larger diameter pig is proximate a juncture between the larger diameter functional line and the smaller diameter functional line.

4. The pig assembly of claim 1, wherein the release mechanism is adapted to release the at least one smaller diameter pig from the larger diameter pig into the smaller diameter functional line when the larger diameter pig is proximate an at least partial blockage within the smaller diameter functional line.

5. A method for maintaining a functional line for conveying fluid, comprising:
- with the pig assembly of claim 1, pigging a subsea line comprising at least a larger diameter functional line and a smaller diameter functional line in fluid communication with one another;
- wherein the larger diameter pig passes through the larger diameter functional line and the smaller diameter pig passes through the smaller diameter functional line; and
- wherein the diameters of the larger diameter functional line and the smaller diameter functional line differ by more than 1 standard API 5L pipeline diameters,
- wherein the pigging of the subsea line is initiated by launching the larger diameter pig of the pig assembly from a pig launcher into the larger diameter functional line such that the larger diameter pig travels in the direction of the smaller diameter functional line; and upon arriving proximate a juncture between the larger diameter functional line and the smaller diameter functional line, the at least one smaller diameter pig is released from the larger diameter pig into the smaller diameter functional line such that the smaller diameter pig travels in the smaller diameter functional line.

6. The method of claim 5, wherein the smaller diameter pig further arrives at a second larger diameter pig in a second larger diameter functional line and is received by the second larger diameter pig.

7. The method of claim 5, wherein the travel of the larger diameter pig and/or the smaller diameter pig is controlled by wireless signals.

8. A pig assembly for maintaining a functional line for conveying fluid, comprising:
- a. a larger diameter pig having an internal compartment, wherein the larger diameter pig is capable of passing through a larger diameter functional line; and
- b. at least one smaller diameter pig capable of passing through a smaller diameter functional line wherein the at least one smaller diameter pig is adapted to fit within the internal compartment of the larger diameter pig;
- wherein the diameters of the larger diameter functional line and the smaller diameter functional line differ by more than 1 standard API 5L pipeline diameters, and wherein the smaller diameter pig is connected by a tether to the larger diameter pig.

9. A pig assembly for maintaining a functional line for conveying fluid, comprising:
- a. a larger diameter pig having an internal compartment, wherein the larger diameter pig is capable of passing through a larger diameter functional line; and
- b. at least one smaller diameter pig capable of passing through a smaller diameter functional line wherein the at least one smaller diameter pig is adapted to fit within the internal compartment of the larger diameter pig;
- wherein the diameters of the larger diameter functional line and the smaller diameter functional line differ by more than 1 standard API 5L pipeline diameters, and wherein the smaller diameter pig is connected by an umbilical capable of transmitting data and/or power from the larger diameter pig to the smaller diameter pig.

10. The pig assembly of any of claims 1, 8, or 9, wherein at least one of the larger diameter pig and the smaller diameter pig further comprises a battery for power storage and supply.

11. The pig assembly of any of claims 1, 8, or 9, wherein the smaller diameter pig further comprises a seal capable of isolating a section of the smaller diameter functional line.

12. The pig assembly of claim 11, wherein the seal comprises an expandable sleeve.

13. The pig assembly of any of claims 1, 8, or 9, wherein the larger diameter pig further comprises an expandable sleeve.

14. The pig assembly of any of claims 1, 8, or 9, wherein at least one of the larger diameter pig and the smaller diameter pig further comprises a sensor or an in line inspection tool.

15. The pig assembly of any of claims 1, 8, or 9, wherein the smaller diameter pig comprises a chemical treatment module for chemically treating a section of the functional line.

16. The pig assembly of any of claims 1, 8, or 9, wherein the smaller diameter pig comprises a repair module having rotary blades.

17. The pig assembly of any of claims 1, 8, or 9, wherein the smaller diameter pig comprises an expansion sleeve for sealing a section of the functional line.

18. A pig assembly for maintaining a pipeline wye apparatus comprising a junction of a largest diameter section of pipeline and two smaller diameter sections of pipeline; wherein the diameters of the two smaller diameter sections of pipeline differ by more than 2 standard API 5L pipeline diameters from the largest diameter section of pipeline, comprising:
- a. a larger diameter pig having an internal compartment, wherein the larger diameter pig is capable of passing through the largest diameter section of pipeline; and
- b. at least two smaller diameter pigs adapted to fit within the internal compartment of the larger diameter pig and be released from the larger diameter pig into each of the two smaller diameter sections of pipeline.

* * * * *